2,840,457

PREPARATION OF DISULFUR DECAFLUORIDE

Anton B. Burg, Los Angeles, Calif., and Norman R. Davidson, Chicago, Ill., assignors to the United States of America as represented by the Secretary of War No Drawing. Application June 1, 1945
Serial No. 597,148

5 Claims. (Cl. 23—205)

This invention relates to an efficient method for the production of a compound composed of sulfur and fluorine in the proportions of one sulfur atom to 5 fluorine atoms. The chemical formula assigned to this compound is $S_2F_{10}$. This compound has the name of disulfur decafluoride. Also, it has been termed sulfur pentafluoride.

On account of its volatility (B. P. 30° C.), density (liquid density approximately 2; gas density about 9 times that of air), high toxicity and certain other favorable characteristics, disulfur decafluoride is considered to be a very useful non-persistent toxic agent of the highest order of aggressiveness. However, there has been the problem of producing this compound cheaply and in large quantities.

The compound $S_2F_{10}$ was discovered a number of years ago when it was found to be a minute by-product in the formation of sulfur hexafluoride by the action of fluorine on sulfur.

A major object of this invention is to provide a method adapted for producing the decafluoride in high yield and on a large scale basis.

In the method of this invention, several factors may be used to influence the yield of the decafluoride. The factors, which were not easily recognized, but finally became regarded as important, are as follows: (1) The sulfur should preferably be in the solid form and barely melted by the heat of the reaction; (2) the presence of oxygen or of oxygen combined in an oxidizing agent may be very harmful, depending upon the proportion involved and should be eliminated insofar as practical; (3) a fresh (moist) fluorine generator usually gives a bad yield; and (4) an inert gas diluent such as nitrogen admixed with the fluorine greatly improves the yield.

Without being limited thereby, the invention will be described with reference to the following procedure:

Example

Fluorine was generated by cells of two type: the LeBeau-Cady cell, containing a KF–HF melt solidifying at 62° C., and the Calcott-Benning cell in which a nearly saturated solution of KF in anhydrous HF was electrolyzed between a nickel anode and a copper cathode, with Dry-Ice reflux systems to minimize loss of HF. The former was more convenient for short runs, whereas the latter was more practical for continuous operation over periods of a week or longer.

The fluorine was passed through a large tube containing dry potassium fluoride and mixed with nitrogen, fed in through a flow-meter. The mixed gases were passed over crushed roll sulfur, contained in long copper boats within 1 x 30 inch copper tubes, cooled by water jackets. The product, with major impurities ($SF_6$ and probably $SF_4$) was collected in large glass traps cooled by liquid air. As many as four fluorine generators were operated together in series at 15 amperes, feeding fluorine into a manifold of as many as five copper reactor tubes, with a pair of traps 2 inches in diameter operating in parallel. It was usual to trap out the larger portion of the product by a preliminary trap operating at —100° C. (Dry Ice under reduced pressure).

The $S_2F_{10}$ was isolated by fractional distillation, followed by passage through sodium hydroxide solution, solid potassium hydroxide and phosphoric anhydride. Its melting point (—53° C.) proved to be extremely sensitive to traces of the usual impurities. The vapor tensions of the pure material follow the equation $$\log_{10} P_{mm.} = \frac{-1856.8}{T} + 1.75 \log_{10} T - 0.008166 + 7.1348$$

from which the boiling point is computed to be 30.1° C. Below the melting point, the vapor tension of the solid follows the equation $$\log_{10} P_{mm.} = 8.32 - \frac{1607}{T}$$

The yields of $S_2F_{10}$ by this process ranged up to thirty percent of the consumed sulfur.

With a reactor-manifold designed to maintain a temperature just at the melting point of sulfur, extremely poor yields resulted, the sulfur being converted almost entirely to $SF_6$. In the reaction which gave high yields of $S_2F_{10}$, the surface of the sulfur is barely melted by the heat of the reaction with suitable cooling of the reactor tubes. Also, it was found desirable to have the sulfur in solid particle form spread in an extended layer on a metal of high heat conductivity.

The effect of oxygen or oxidizing substances, such as water vapor, on the reaction is apparently not catalytic. It appears that oxygen competes with the fluorine in the reaction.

Poor yields in using moist fluorine generators are ascribed to the considerable proportion of $OF_2$ which such a generator helps. This fluoride of oxygen appears to have a specific harmful effect. Water vapor has a similar effect. Best results could be obtained after operation of the generators for a number of hours.

The proportion of fluorine to nitrogen or other inert gas may vary over a considerable range, e. g., the $N_2/F_2$ volume ratio being varied from 5 to 30, but preferably this dilution ratio should be in the range of 7 to about 15 for optimum yields. Also the nitrogen or inert gas should be substantially free of harmful oxidizing agents or oxygen. Preferably, the nitrogen should be at least 99.7% pure.

As an alternate diluting agent, carbon dioxide may be used instead of nitrogen with economies, since solid carbon dioxide may be used as a condensing agent, but the handling of the mixed reaction product with the carbon dioxide gives some added difficulties. It has been indicated that the use of nitrogen or inert gas as a diluent may be substantially reduced, if the reactor tube is large and well cooled, and particularly if the volatile products are allowed to serve to dilute the fluorine stream as it progresses down the tube. It has also been indicated that the vapor product or sulfur fluoride such as $SF_6$ and $SF_4$ may be circulated to serve as a diluent in the reaction tubes.

If desired, the pure solid sulfur may be replaced in the reaction tubes by a mixture of the sulfur with a solid substance having no tendency to react with fluorine, for example, sodium fluoride. Such mixtures may serve to lower the intensity of the heated reaction, increase the exposed reactive surface area of the sulfur, and/or act to conduct away heat.

The purification of the desired disulfur decafluoride has been improved by washing with alkaline solution, such as sodium hydroxide solution followed by treatment with solid caustic or potassium hydroxide and phosphoric acid anhydride in series.

Disulfur decafluoride is inert to many common chemical reagents, such as caustic alkalies, strong acids and the ordinary organic solvents. Its solubility in water is very slight, but it tends to dissolve in oils, sometimes with reaction. Thermal decomposition of the decafluoride is slow at 200° C., but becomes rapid as the temperature is increased thereabove. Products of the decomposition are $SF_6$ and sulfur compounds which etch glass seriously. Decomposition of the decafluoride by charcoal is limited in extent. Chlorine attacks the decafluoride yielding a slightly volatile liquid.

This invention increases the efficiency of production of disulfur decafluoride, tending to make this substance available as a particularly useful chemical warfare agent and for other possible applications.

We claim:

1. The method of preparing disulfur decafluoride which comprises contacting fluorine with solid sulfur at a suitably controlled rate while maintaining the temperature of the sulfur below its melting point.

2. The method of preparing disulfur decafluoride which comprises passing a stream of substantially dry fluorine mixed with nitrogen over crushed roll sulfur contained in a copper reactor, cooling the reactor to maintain the sulfur at below its melting point, fractionally condensing sulfur decafluoride from vapor products formed in the reactor, and purifying the sulfur decafluoride by passage through sodium hydroxide solution solid potassium hydroxide and phosphoric acid anhydride.

3. The method of preparing disulfur decafluoride which comprises diluting dry fluorine with nitrogen of high purity in a nitrogen to fluorine volume ratio ranging from about 5 to 30 to form a gaseous mixture substantially free of oxygen and other oxidizing agents, and contacting said gaseous mixture with solid sulfur.

4. In a process of producing disulfur decafluoride, in increased yield, contacting solid particles of sulfur spread in an extended layer in a metal of high heat conductivity with a gaseous mixture containing fluorine but substantially free of oxygen and water vapor while cooling the sulfur.

5. In a process of producing increased yields of a sulfur fluoride having 5 fluorine atoms combined with a sulfur atom, admixing sulfur fluoride vapors with fluorine, and contacting the thus diluted fluorine with solid sulfur.

References Cited in the file of this patent

Denbigh et al.: Nature, vol. 131 page 763 (1933).
Denbigh et al.: Journal of the Chemical Society, London, pp. 1346–52 (1934).
T. Moeller: "Inorganic Chemistry," pp. 488, 489, copyright 1952, John Wiley & Sons, Inc., N. Y. C.